(12) United States Patent
Tucker

(10) Patent No.: US 6,894,780 B2
(45) Date of Patent: May 17, 2005

(54) PILOT TONE MULTIPLEXING OF POLARIZATION STATES IN HETERODYNE OPTICAL COMPONENT ANALYSIS

(75) Inventor: Rodney S. Tucker, Hawthorn (AU)

(73) Assignee: Agilent Technologies, Inc., Palo Alto, CA (US)

( * ) Notice: Subject to any disclaimer, the term of this patent is extended or adjusted under 35 U.S.C. 154(b) by 475 days.

(21) Appl. No.: 10/174,778

(22) Filed: Jun. 18, 2002

(65) Prior Publication Data

US 2003/0231311 A1 Dec. 18, 2003

(51) Int. Cl.$^7$ .............................. G01J 4/00; G01V 8/00; H04J 14/06; H04B 10/00
(52) U.S. Cl. ................... 356/364; 250/559.09; 398/65; 398/152
(58) Field of Search ................................ 356/364, 337, 356/338, 339, 340, 341, 342, 343, 369, 370; 398/65, 152, 184, 205; 359/483; 250/341.3, 559.09; 702/40, 106

(56) References Cited

U.S. PATENT DOCUMENTS 6,239,873 B1 * 5/2001 Videen ........................ 356/369

6,380,533 B1    4/2002 Jopson et al.

FOREIGN PATENT DOCUMENTS

EP          0 654 657 A2    11/1994

OTHER PUBLICATIONS

Patent Abstracts of Japan, vol. 0134, No. 06 (P–930), Sep. 8, 1989 (Sep. 08, 1989), & JP 1 147334 A (Sumitomo Electric Ind Ltd), Jun. 9, 1989 (Jun. 09, 1989), *abstract*.
European Search Report Dated: Nov. 3, 2004.

* cited by examiner

Primary Examiner—Gregory J. Toatley, Jr.
Assistant Examiner—Roy M. Punnoose

(57) ABSTRACT

A method and apparatus for determining polarization-resolved scattering parameters of an optical device. A method comprises stimulating a port of the optical device with a stimulation field having at least two polarization states, measuring the optical field emerging from the port in amplitude and phase, and calculating the scattering parameters using the measurements. By stimulating a port of an optical device with a stimulation field having at least two different polarization states, measurements needed to determine scattering parameters of the optical device can be conducted by stimulating the port with only one sweep of a swept optical source.

20 Claims, 3 Drawing Sheets

PILOT TONE MULTIPLEXING OF POLARIZATION STATES IN HETERODYNE OPTICAL COMPONENT ANALYSIS

BACKGROUND OF THE INVENTION

1. Technical Field of the Invention

The present invention relates generally to the optical measurement field. More particularly, the invention relates to a method and apparatus for determining polarization-resolved scattering parameters of an optical device.

2. Description of Related Art

Coherent frequency-swept heterodyne network analysis is a known technique for measuring characteristics of optical devices. For example, characteristics such as group delay, loss and polarization-dependent loss (PDL) can all be obtained using heterodyne network analysis. It is also known that the polarization-resolved scattering parameters provide the most general and complete characterization of an optical device. In particular, once the full polarization-resolved scattering parameters of an optical device have been determined, all other measurable device parameters, such as group delay, PDL and the like can be readily calculated.

There is a need for a technique for determining polarization-resolved scattering parameters of an optical device in which measurements of fields emerging from the device can be made accurately and in a reduced period of time.

SUMMARY OF THE INVENTION

Embodiments in accordance with the invention provide a method and apparatus for determining polarization-resolved scattering parameters of an optical device in which measurements of fields emerging from the optical device can be made accurately and in a reduced period of time.

A method for determining scattering parameters of an optical device according to the present invention comprises stimulating a port of the optical device with a stimulation field having at least two polarization states. The optical field emerging from the port is then measured in amplitude and phase, and the scattering parameters are calculated using the measurements.

It has been discovered that by stimulating a port of an optical device with a stimulation field having at least two different polarization states, measurements needed to determine scattering parameters of the optical device can be conducted by stimulating the port with only one sweep of a swept optical source. As a result, problems resulting from a lack of repeatability in setting the optical frequency of the swept optical source between sweeps are avoided. Furthermore, because only one sweep of the swept optical source is needed to measure the emerging field at a port for the at least two polarization states, the overall measurement process can be completed in a reduced period of time.

Furthermore, the invention provides embodiments with other features and advantages in addition to or in lieu of those discussed above. Many of these features and advantages are apparent from the description below with reference to the following drawings.

DETAILED DESCRIPTION OF THE EXEMPLARY EMBODIMENTS OF THE INVENTION

Figure 1:
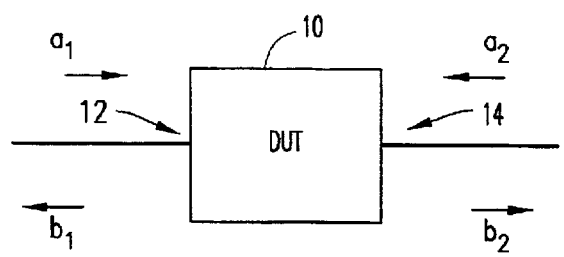
FIG. 1 is a block diagram that schematically illustrates the incident and emerging fields of a device under test (DUT) as represented by a polarization-independent scattering matrix to assist in explaining the present invention.
Figure 2:
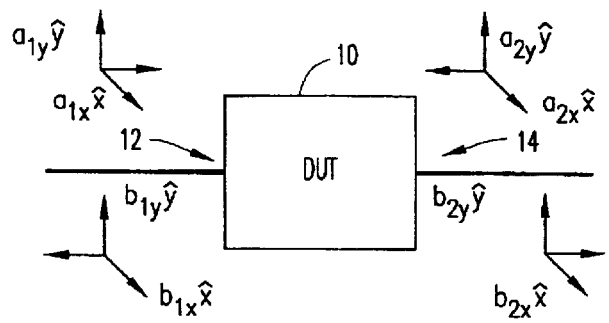
FIG. 2 is a block diagram that schematically illustrates the incident and emerging fields of a DUT as represented by a polarization-resolved scattering matrix to further assist in explaining the present invention.

A scattering matrix (S-Matrix) relates emerging fields to incident fields in an optical device, and can be understood with reference to FIGS. 1 and 2. In particular, FIGS. 1 and 2 are block diagrams that schematically illustrate two-port optical device under test (DUT) 10, and the incident and emerging fields at ports 12 and 14 thereof. In FIG. 1, optical fields $a_1$ and $a_2$ are incident on ports 12 and 14, respectively, and optical fields $b_1$ and $b_2$ emerge from ports 12 and 14, respectively. The incident and emerging fields are related to one another by the following scattering matrix:

$$\begin{bmatrix} b_1 \\ b_2 \end{bmatrix} = [S] \begin{bmatrix} a_1 \\ a_2 \end{bmatrix} \text{ where} \quad (1)$$

$$[S] = \begin{bmatrix} S_{11} & S_{12} \\ S_{21} & S_{22} \end{bmatrix}$$

A polarization-resolved scattering matrix relates the emerging fields to the incident fields, and takes into account the polarization of the fields. Thus, as shown in FIG. 2, the fields $a_1$, $a_2$, $b_1$ and $b_2$ are resolved into components in the x-direction and the y-direction to give a complete description of the polarization states of the fields.

The resolved incident and emerging fields illustrated in FIG. 2 are related to one another by the following general polarization-resolved scattering matrix:

$$\begin{bmatrix} \begin{pmatrix} b_{1x} \\ b_{1y} \end{pmatrix} \\ \begin{pmatrix} b_{2x} \\ b_{2y} \end{pmatrix} \end{bmatrix} = \begin{bmatrix} \begin{pmatrix} S_{11xx} & S_{11xy} \\ S_{11yx} & S_{11yy} \end{pmatrix} & \begin{pmatrix} S_{12xx} & S_{12xy} \\ S_{12yx} & S_{12yy} \end{pmatrix} \\ \begin{pmatrix} S_{21xx} & S_{21xy} \\ S_{21yx} & S_{21yy} \end{pmatrix} & \begin{pmatrix} S_{22xx} & S_{22xy} \\ S_{22yx} & S_{22yy} \end{pmatrix} \end{bmatrix} \begin{bmatrix} \begin{pmatrix} a_{1x} \\ a_{1y} \end{pmatrix} \\ \begin{pmatrix} a_{2x} \\ a_{2y} \end{pmatrix} \end{bmatrix} \quad (2)$$

It is to be noted that this general polarization-resolved scattering matrix is made up of four 4×4 sub-matrices. Accordingly, the general polarization-resolved scattering matrix can be considered as a set of polarization-resolved sub-matrices. Each of these sub-matrices represents a transmission characteristic or a reflection characteristic of DUT 10.

Figure 3:
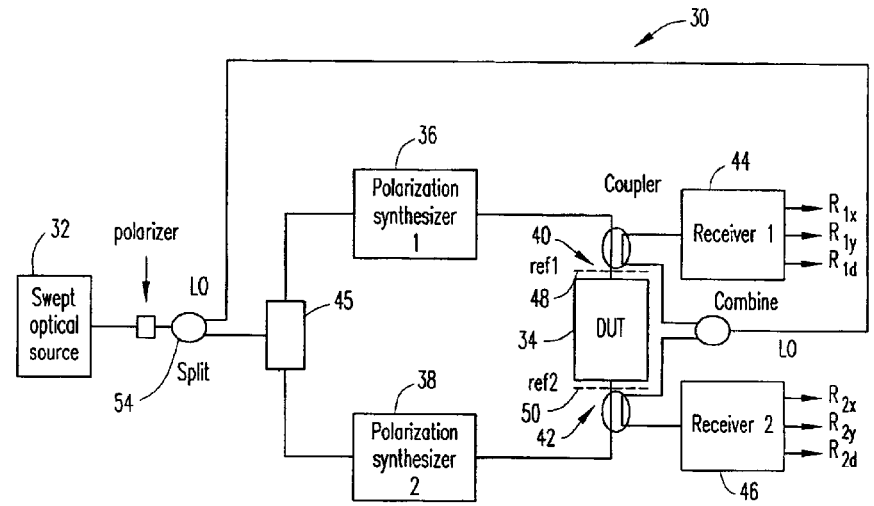
FIG. 3 is a block diagram that schematically illustrates a polarization-resolved S-matrix test set to further assist in explaining the present invention.

In order to determine the polarization-resolved scattering matrix of an optical DUT, it is necessary to place the DUT in a polarization-resolving test set. The test set applies optical stimulus signals to the DUT and measures the outputs from the DUT in amplitude and phase. FIG. 3 is a block diagram that schematically illustrates a polarization-resolved S-Matrix test set to assist in explaining the present invention.

As shown in FIG. 3, the test set, generally designated by reference number 30, includes swept optical source 32 that provides stimulus signals to DUT 34 through polarization synthesizers 36 and 38. Polarization synthesizers 36 and 38 control the state of polarization of the stimulus signals applied to input port 40 and output port 42, respectively, of the DUT. Emerging optical fields from ports 40 and 42 of DUT 34 are measured using receivers 44 and 46, respectively. The receivers are polarization sensitive and each receiver has three outputs. One of the outputs from each receiver ($R_{1x}$ or $R_{2x}$) represents the component of the emerging field in the x-direction, a second output from each receiver ($R_{1y}$ or $R_{2y}$) represents the component of the emerging field in the y-direction, and a third output from each receiver ($R_{1d}$ or $R_{2d}$) represents a polarization diversity output. Optical switch 45 is operable to determine which of ports 40 or 42 of DUT 34 receives the stimulus signal.

FIG. 3 also illustrates reference planes 48 and 50 at input and output ports 40 and 42, respectively, of the DUT. As is known to those skilled in the art, the polarization-resolved scattering matrix is determined at these reference planes.

Techniques for measuring the scattering parameters (S-Parameters) of optical devices are not completely phase-consistent. This means that the phase reference for some of the scattering parameters is different from the phase reference for other scattering parameters. As a result, not all device characteristics can be calculated directly from the scattering parameters.

In a procedure for determining the polarization-resolved scattering matrix of an optical device, one of the four 4×4 sub-matrices is determined at a time. To determine a particular sub-matrix, the ports of the optical device are stimulated one at a time. In addition, to determine all four elements of a sub-matrix, each port of the optical device is separately stimulated for each polarization state of the incident field, and the magnitude and phase of the emerging field is separately measured for each polarization state.

Measurement of the emerging field at a port for each polarization state is accomplished using an adjustable polarization synthesizer. For example, in a common measurement procedure, a polarization synthesizer associated with a first port of a DUT having two ports is set to a first polarization state and the swept optical source is operated to permit the magnitude and phase of the emerging field at the first port to be measured for the first polarization state. The polarization synthesizer is then adjusted to a second polarization state and the swept optical source is again operated to permit the magnitude and phase of the emerging field at the first port to be measured for the second polarization state. The process in then repeated using a polarization synthesizer associated with the second port of the DUT to measure the optical fields emerging from the second port.

Each scattering parameter is a complex number (with both an amplitude and a phase). The receivers measure the amplitude and phase relative to the amplitude and phase of a local amplifier LO (see FIG. 3). At optical frequencies, however, the phase of the optical field is a very strong function of the exact location of the measurement reference plane. For example, a shift in the reference plane of only one optical wavelength will change the phase shift by 360 degrees. Also, as shown in FIG. 3, the output of swept optical source 32 is split into a path to the receiver through the DUT, and a LO path by splitter 54. If there is any difference in the path length between swept optical source 32 and a receiver through the DUT compared with the path length through the LO path, the phase shift is a strong function of the optical frequency. If, for example, the difference in the path lengths is 100 cm, a change in the optical frequency of 3 GHz will change the phase shift by 360 degrees. This effect illustrates that for repeatable and consistent measurements, the optical frequency should be highly repeatable.

In practical measurement systems, path lengths of 100 cm or more are common. At the same time, a phase shift (i.e., a phase uncertainty) of 360 degrees is unacceptable in a high-precision measurement instrument. Typically, one would seek an uncertainty of 0.1 degree or better. For a 0.1 degree uncertainty in phase measurements, the uncertainty in the frequency needs to be 1 MHz or less.

The uncertainty associated with setting the optical frequency of a swept optical source creates difficulties with regard to accurately determining the 4 S-Parameters of a sub-matrix. These difficulties are due to the fact that the 4 S-Parameters are defined in terms of the same phase reference. If a swept optical source is swept through a measurement range once for each input polarization state, the repeatability of the swept optical source should be better than about 1 MHz between sweeps. Alternatively, if the optical source is stepped across the measurement range, the repeatability requirements of the source can be relaxed. Stepped-frequency measurements, however, are not practical in homodyne network analyzer systems where it is required that the optical source be swept continuously.

The inability of a swept optical source to provide the necessary level of repeatability in setting the optical frequency of the source between sweeps to measure the emerging fields at two polarization states, can result in inaccurate measurements to determine the scattering parameters of an optical device. In addition, because two sweeps of the swept optical source are needed to measure the emerging field at the two polarization states of the incident field, the overall time required to complete the measurements is increased significantly.

As described previously, to determine polarization-resolved scattering parameters of a polarization-resolved scattering matrix of an optical device, it is necessary to measure the magnitude and phase of emerging optical fields at ports of the optical device for incident fields having at least two polarization states. A variety of different input polarization states can be used for the measurements. For example, a simple and effective combination of two polarization states that is known in the prior art is linearly polarized light in the x and y directions. By measuring the x and y components of the outputs of the receivers in the polarization-resolved S-Matrix test set, all four entries in a 4×4 sub-matrix of a polarization-resolved scattering matrix of a DUT can, in principle, be determined.

An alternative approach is to use three different polarization states at each port of the DUT. This approach is based on a technique first introduced by R. C. Jones. By using this technique, the ratios of the receiver outputs are calculated at each optical frequency; and from the ratios, all entries in a sub-matrix of a polarization-resolved scattering matrix relative to a reference amplitude and phase can be calculated. Further details of this alternative approach are described in commonly assigned U.S. patent application Ser. No. [PD- No. #10/011,097-1] filed concurrently herewith and entitled MEASUREMENT OF POLARIZATION-RESOLVED OPTICAL SCATTERING PARAMETERS, the disclosure of which is incorporated by reference herein. The present invention is intended to cover embodiments in which optical stimulation fields having at least two polarization states are applied to a DUT.

Figure 4:
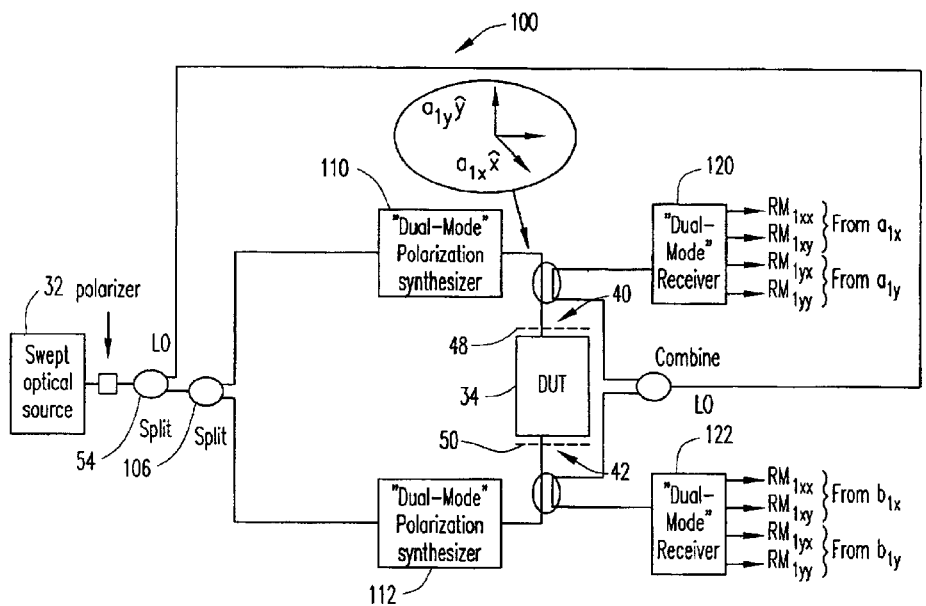
FIG. 4 is a block diagram that schematically illustrates a polarization-resolved S-Matrix test set according to an embodiment of the present invention.

FIG. 4 is a block diagram that schematically illustrates polarization-resolved S-Matrix test set 100 for determining scattering parameters of an optical device according to an embodiment of the present invention. Initially, test set 100 differs from test set 30 of FIG. 3 in that optical switch 45 of test set 30 has been replaced by splitter 106. In particular, as shown in FIG. 4, splitter 106 receives the signal from swept optical source 32 via splitter 54, and directs the split signal to polarization synthesizers 110 and 112.

According to an embodiment of the present invention, the at least two polarization states are applied simultaneously to a port of the DUT; and the contribution of the stimulation field to the x and y components of the emerging field are measured simultaneously. As will be described hereinafter, providing simultaneous stimulation and measurement using a stimulation field having different polarization states eliminates problems caused by lack of repeatability in setting the optical frequency of the swept optical source between sweeps; and, in addition, significantly speeds up the measurement process.

According to an embodiment of the present invention, two polarization states can be applied simultaneously to a port of optical DUT 34 by replacing adjustable polarization synthesizers 36 and 38 in test set 30 in FIG. 3 with "dual-mode" polarization synthesizers 110 and 112; and by replacing receivers 44 and 46 in the test set 30 with "dual-mode" receivers 120 and 122. As shown in FIG. 4, dual mode polarization synthesizer 110 and dual-mode receiver 120 are associated with input port 40 of DUT 34, and dual-mode polarization synthesizer 112 and dual-mode receiver 122 are associated with output port 42 of the DUT.

Each dual-mode polarization synthesizer 110 and 112 simultaneously generates two orthogonal polarization states, in the x and y directions, at its respective port of the DUT as is illustrated in FIG. 4 with respect to polarization synthesizer 110. Each dual-mode receiver detects the emerging optical field at its respective port and resolves the detected field into its two orthogonal (x and y) components. In addition, each dual-mode receiver resolves that part of the emerging field in the x and y directions that result from the x and y components in the field incident to the DUT. For example, in FIG. 4, the $RM_{1xx}$ output of the dual-mode receivers is the received field in the x direction, resulting from the x component of the input field. In general terms, $RM_{ijk}$ is the received field in the j direction, resulting from the k component of the input field.

Dual-mode polarization synthesizers 110 and 112 are identical and dual-mode receivers 120 and 122 are identical. Accordingly, only dual-mode polarization synthesizer 110 and dual-mode receiver 120 are described in detail herein. In particular, FIG. 5 illustrates details of dual-mode polarization synthesizer 110, and FIG. 6 illustrates details of dual-mode receiver 120.

Figure 5:
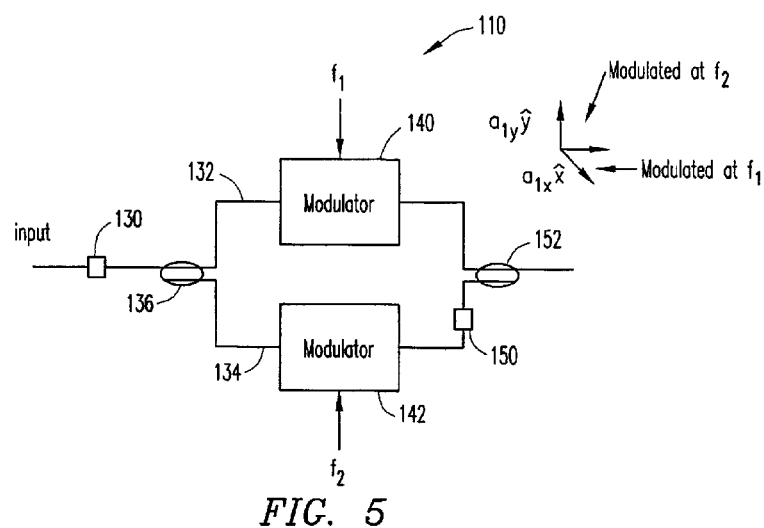
FIG. 5 is a block diagram that schematically illustrates a dual-mode polarization synthesizer of FIG. 4 in greater detail.

With reference to FIG. 5, dual-mode polarization synthesizer 110 uses pilot-tone multiplexing techniques to identify each of the two orthogonal polarizations in the light input thereto. In particular, the incoming light to polarization synthesizer 110 from swept optical source 32 (see FIG. 4) is first linearized using polarizer 130; and the linearized light is then split into two paths 132 and 134 by splitter 136. The light in paths 132 and 134 is then intensity modulated at frequencies $f_1$ and f2, respectively, using modulators 140 and 142, respectively. These frequencies are used to identify the signals in dual-mode receiver 120 as will be explained hereinafter. In order to avoid sampling problems in receiver 120 caused by aliasing, the frequencies $f_1$ and $f_2$ should generally be at least twice the sampling frequency of the receiver. Also, the modulation depth of the pilot tone modulation should be accurately controlled.

Ninety-degree splice 150 is located at the output of one of the two modulators, e.g., at the output of modulator 142 in FIG. 5. The 90-degree splice ensures that the two modulated fields are orthogonal to one another (one in the x direction and one in the y direction). In the embodiment illustrated in FIG. 5, the component of the field in the x direction is modulated at frequency $f_1$, and the component of the field in the y direction is modulated at frequency $f_2$. The two orthogonal modulated fields are then combined by combiner 152 to provide a stimulation field having two polarization states for stimulating port 40 of DUT 34.

Figure 6:
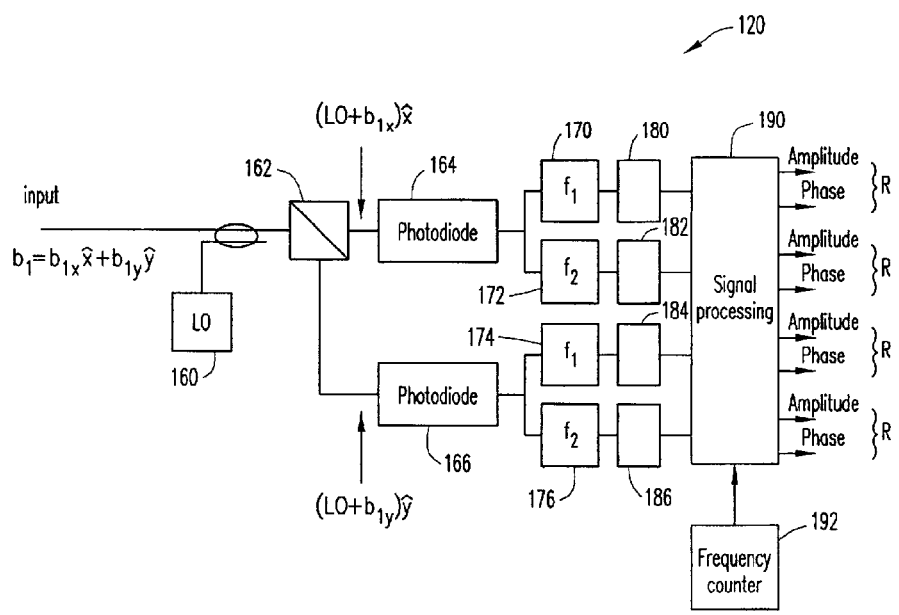
FIG. 6 is a block diagram that schematically illustrates a dual-mode receiver of FIG. 4 in greater detail.

Dual-mode receiver 120 is illustrated in greater detail in FIG. 6. As shown, the emerging field from port 40 of DUT 34 and input into receiver 120 is first combined with LO polarization beam 160. The combined beam is directed to beamsplitter 162 that splits the combined beam into its x and y components. LO polarization beam 160 is at 45 degrees to the beamsplitter axis. The x component signal from beamsplitter 162 is passed through photodiode 164 and the y component signal is passed through photodiode 166 to convert the light signals to electrical signals. The x component electrical signal and the y component electrical signal are then passed through pairs of bandpass filters 170, 172 and 174, 176, respectively, to separate the components due to the x and y components of the field incident on port 40. Envelope (amplitude) detectors 180, 182, 184 and 186 are placed at each of four inputs to signal processing circuitry 190. The envelope detectors detect the amplitude of the signals at the pilot tone frequencies $f_1$ and $f_2$, and input these amplitude signals to signal processing circuitry 190.

The phase of each of the field components is detected by frequency counter 192 coupled to signal processing circuitry 190. As illustrated in FIG. 6, the amplitude and phase of each component of the signal emerging from port 40 of the DUT in each polarization state is thus measured and output from signal processing circuitry 190 as signals $RM_{1xx}$, $RM_{1xy}$, $RM_{1yx}$ and $RM_{1yy}$. From these signals and from corresponding signals output from dual-mode receiver 122 associated with output port 42 of the DUT, all scattering parameters of DUT 34 can be calculated.

Figure 7:
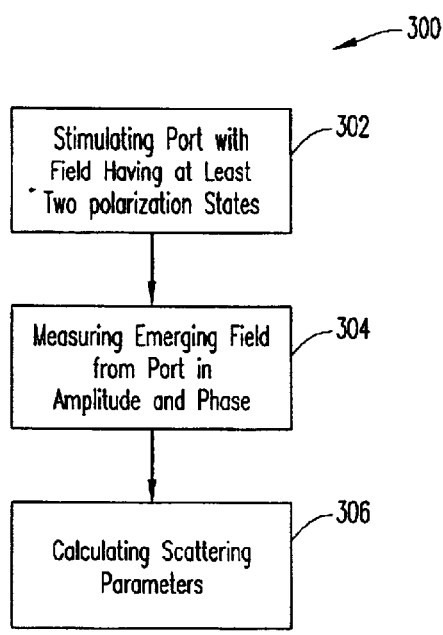
FIG. 7 is a flow chart that illustrates steps of a method for determining scattering parameters of an optical device according to another embodiment of the present invention

FIG. 7 is a flow chart that illustrates steps of method 300 for determining polarization-resolved scattering parameters according to an embodiment of the present invention. As shown in FIG. 7, a port of an optical DUT is first stimulated with a stimulation field having at least two polarization states (step 302). The amplitude and phase of each component of the optical field emerging from the port is then measured (step 304), and scattering parameters of the DUT are calculated from the measured emerging field (step 306).

While what has been described constitutes exemplary embodiments of the present invention, it should be recognized that the invention can be varied in many ways without departing from the scope thereof. For example, as indicated above, although embodiments herein describe the stimulation of a port of an optical device with a stimulation field having two different polarization states, it is not intended to so limit the invention as a stimulation field having more than two polarization states, e.g., three polarization states, may be used. Because the invention can be varied in many ways, it should be understood that the invention should be limited only insofar as is required by the scope of the following claims.

I claim:

1. A method for determining scattering parameters of an optical device, comprising:

stimulating a port of an optical device with a stimulation field having at least two different polarization states;

measuring an optical field emerging from the port in amplitude and phase; and calculating scattering parameters using the measurements.

2. The method according to claim 1, wherein said at least two polarization states comprises two polarization states.

3. The method according to claim 2, wherein said two polarization states comprise orthogonally polarized states.

4. The method according to claim 1, wherein said measuring step comprises measuring contributions of the stimulation field to polarization components of the field emerging from the port.

5. The method according to claim 4, wherein said measuring step comprises simultaneously measuring the contributions of the stimulation field to the polarization components of the field emerging from the port.

6. The method according to claim 1, wherein said optical device comprises two ports, and wherein said steps of stimulating a port and measuring an optical field emerging from the port are performed for each port, and wherein said calculating step comprises calculating scattering parameters using the measurements of optical fields emerging from each port.

7. A method for determining scattering parameters of a polarization-resolved scattering matrix of an optical device having first and second ports, comprising:

stimulating said first port with a stimulation field having at least two polarization states;

first measuring a field emerging from said first port in amplitude and phase;

stimulating said second port with a stimulation field having said at least two polarization states;

second measuring a field emerging from said second port in amplitude and phase; and calculating said scattering parameters using the first and second measurements.

8. The method according to claim 7, wherein said at least two polarization states comprises two polarization states.

9. The method according to claim 8, wherein said two polarization states comprise orthogonally polarized states.

10. The method according to claim 7, wherein said first and second measuring steps comprise measuring contributions of the stimulation field applied to said first and second ports to polarization components of the field emerging from said first and second ports.

11. An apparatus for determining scattering parameters of an optical device, comprising:

an optical source;

a polarization synthesizer in a path from said optical source to a port of said optical device for stimulating said port with a stimulation field having at least two polarization states; and a receiver for measuring an optical field emerging from said port in amplitude and phase, said scattering parameters being calculable using said measurements.

12. The apparatus according to claim 11, wherein said polarization synthesizer stimulates said port with a stimulation field having two orthogonal polarization states.

13. The apparatus according to claim 12, wherein said polarization synthesizer includes a splitter for splitting an input signal from said source into first and second signals, first and second modulators for intensity modulating said first and second signals at first and second frequencies, respectively, to provide first and second modulated signals, and a combiner for combining said first and second modulated signals to provide said stimulation field.

14. The apparatus according to claim 13, wherein said polarization synthesizer further includes a 90-degree splice at an output of one of said first and second modulators such that said first and second modulated signals are orthogonal to one another.

15. The apparatus according to claim 12, wherein said receiver includes a LO polarization beam combined with the field emerging from said port to provide a combined signal, a beamsplitter for splitting the combined signal into first and second orthogonal signals, and filters for separating the first and second orthogonal signals into component signals due to contributions of the incident field.

16. The apparatus according to claim 15, wherein said beamsplitter splits the combined signal into first and second orthogonal optical signals, and wherein said receiver further includes first and second photodiodes for converting said first and second orthogonal optical signals into first and second electrical signals, said filters separating said first sand second electrical signals into said component signals.

17. The apparatus according to claim 16, wherein said receiver further includes detectors for detecting the amplitude of said component signals, and a frequency counter for detecting the phase of said component signals.

18. The apparatus according to claim 17, wherein said receiver further includes signal processing circuitry for measuring each component signal in amplitude and phase.

19. The apparatus according to claim 11, wherein said polarization synthesizer comprises a first polarization synthesizer for stimulating a first port of said optical device with a stimulation field having at least two polarization states, and wherein said apparatus further includes a second polarization synthesizer for stimulating a second port of said optical device with a stimulation field having said at least two polarization states.

20. The apparatus according to claim 19, wherein said receiver comprises a first receiver for measuring the field emerging from said first port, and wherein said apparatus further includes a second receiver for measuring a field emerging from said second port, said scattering parameters being calculated using the measurements from said first and second receivers.

* * * * *